Patented Nov. 18, 1947

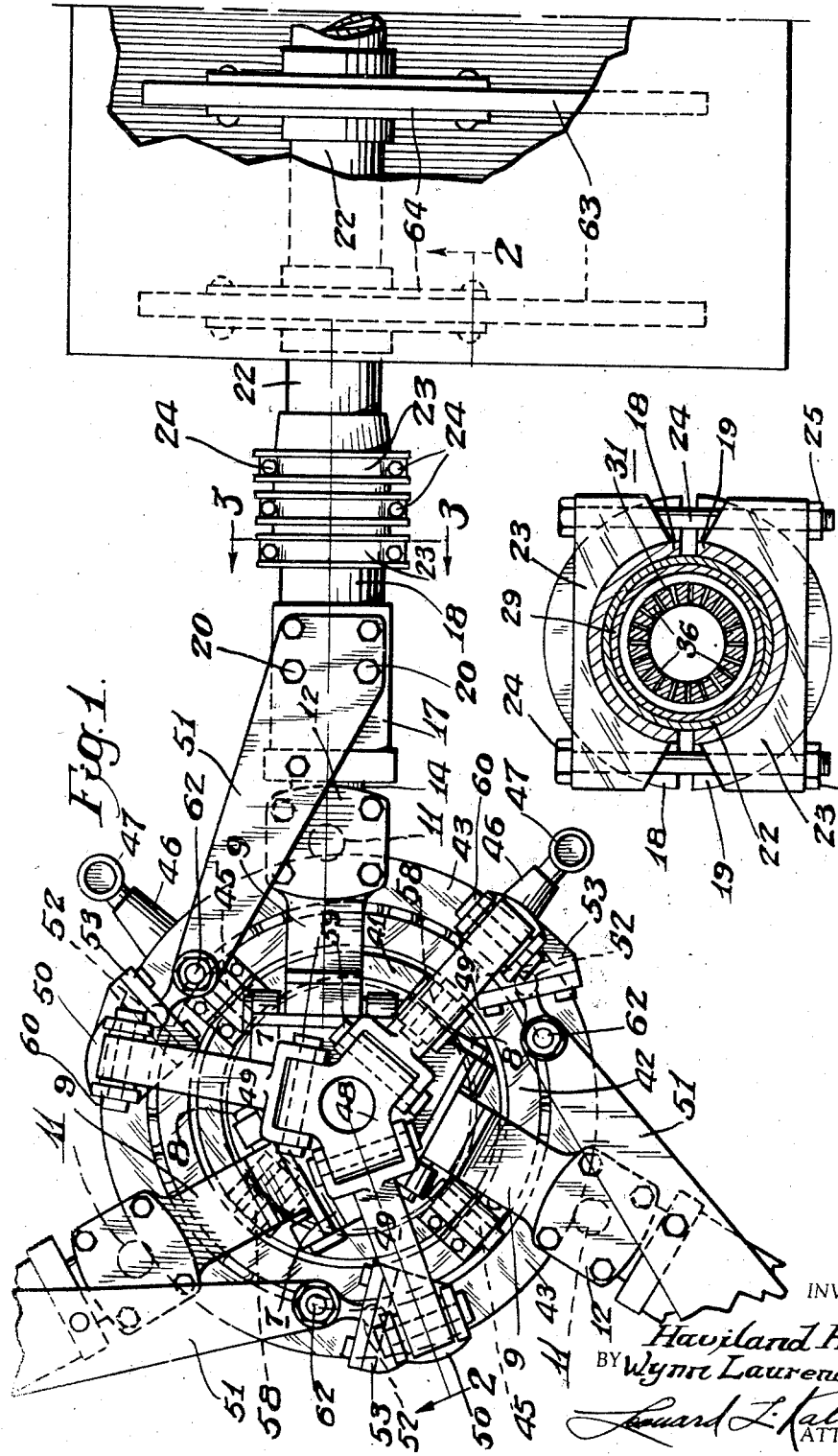

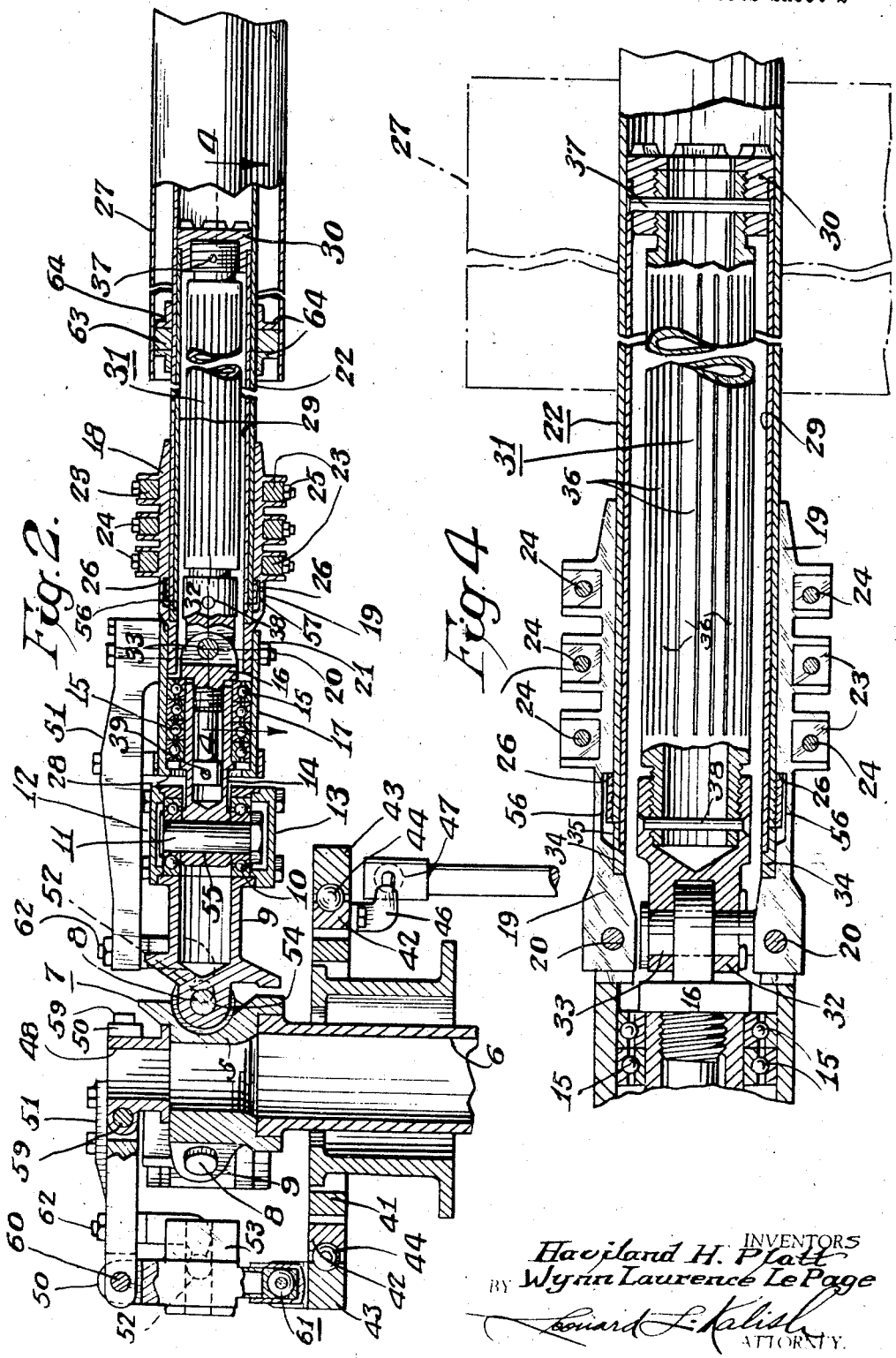

2,430,947

UNITED STATES PATENT OFFICE 2,430,947

AIRSCREW

Haviland H. Platt, New York, N. Y., and Wynn Laurence Le Page, Ardmore, Pa., assignors, by mesne assignments, to McDonnell Aircraft Corporation, St. Louis, Mo., a corporation of Maryland Application September 23, 1943, Serial No. 503,478

8 Claims. (Cl. 170—173)

1

The present invention relates to airscrews and it relates more particularly to lifting rotors of aircraft which derive their chief sustentation from generally vertically directed airscrews, either power driven or actuated by relative airflow. More specifically, the present invention is concerned with attachment means whereby the airfoil blades of airscrews are securely fastened to their hubs and whereby difficulties and disadvantages present in attachment constructions heretofore used are overcome.

It has been common practice to construct airfoil blades for the rotors of rotary wing aircraft each with a tubular spar to which the airfoil surface is attached by means of collars carrying suitably formed ribs. The inboard end of the spar is then attached to the hub through a fitting which must have sufficient strength to transmit to the hub the entire centrifugal force developed by the whole mass of the blade in its rotation. The spar tubes are customarily fabricated of material having great strength, such as alloy steel heat-treated to a high tensile stress value. The limitations of known fabrication methods preclude the possibility of forming the end into a bolt flange or other such ready attachment device. It has consequently been common practice to attach a suitable separate flange member to the root end of the spar by forming the flange with a sleeve extension, fitting snugly over the root end of the spar and to fasten it in place with a number of taper pins received in drilled and reamed holes passing through the sleeve and spar. The centrifugal load of the blades is thus carried by the taper pins in shear. During steady tension this method of attachment weakens the spar only by the reduction of cross-sectional area caused by the outboard set of holes. This reduction is normally only a small fraction of the total area and the joint is therefore reasonably efficient in holding the steady centrifugal force, which is the only important load on the spar in flight.

When the rotor is not running and when it is being started or stopped a greatly different load condition obtains however. In each of these phases of operation, the blade root is subjected to a severe bending movement which undergoes fluctuation from zero to the maximum, as also does the steady load when the rotor is started and stopped. As is well known, holes of small diameter cause serious stress concentration in the surrounding material and may lead to local fibre stresses several times the mean value. Thus the material may be locally overstressed in the vicinity of the holes, a condition which leads to crystallization and fatigue failure of the material after a number of load fluctuations.

An object of our invention is to provide a means of attachment of the blade spar to the rotor hub which shall not be subject to local overstresses. A further object is to provide an attachment which is at no place weaker than the undrilled spar—greater strength and safety being thus secured.

With these and other objects and advantages in view which will appear more fully from the following detailed description, appended claims and accompanying drawings, the present invention includes a novel split clamping sleeve which is bolted over the root of the blade spar and is capable of holding by friction the entire force, or a large part thereof, which may be acting on the spar in service. Our invention may optionally also include, as an additional safeguard, a collar welded onto the inboard end of the spar and capable of withstanding, by bearing against the clamp members, a large portion of the load even if the clamp friction were to be removed.

For the purpose of illustrating the invention, there is shown in the accompanying drawings one form thereof which is at present preferred, since the same has been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a top plan view of a helicopter rotor hub, with its control parts and with one blade attached, incorporating a bearing of our invention in the attachment of the blade to the hub.

Figure 2 represents a horizontal cross-sectional view generally along line 2—2 of Figure 1, showing the attachment of the rotor blade to the hub.

Figure 3 represents a vertical cross-sectional view on an enlarged scale, generally along the line 3—3 of Figure 1, showing the blade spar and attachment clamp.

Figure 4 represents a horizontal cross-sectional view, on an enlarged scale, generally along line 4—4 of Figure 2, showing the blade attachment and blade root clamp of a preferred form of our invention.

The novel blade attachment of our present invention has been shown, for purposes of illustration, as used in a rotor having a novel torsion bearing which is the subject of co-pending application Serial No. 493,042 of Haviland H. Platt, filed July 1, 1943. However, it is to be understood that the blade attachment of the present invention may be used equally well with other constructions.

In the embodiment shown in the accompanying drawings, a rotor hub 5 is mounted on a drive shaft 6 to which it is rigidly secured by bolts, or other suitable means (not shown).

The hub 5 is provided with rotor blades only one of which is shown and described herein; it being understood that the other two blades and associated elements are identical with the described blade in every respect.

Formed integrally with the hub 5 are spaced, apertured pivot lugs 7 which are adapted to receive a generally horizontally extending pivot pin 8 in suitable anti-friction bearings or bushings. The pin 8 passes through an eye 54 formed at the inboard end of the attachment link 9, the outboard end of which is forked and apertured, on a generally vertical axis, and is provided with ball bearings 10 supporting a generally vertical pivot pin 11, which is held in place and protected from dust by top and bottom cover plates 12 and 13 respectively.

A blade supporting spindle 14 is pivotally supported by the pin 11 which passes through an eye 55 formed on the inboard end of the spindle 14. The blade supporting spindle 14 is adapted, at its outboard end, to hold a number of ball bearings 15.

The bearings 15 are retained in place on spindle 14 by an eye-nut 16 which is screwed into a suitably threaded recess in spindle 14.

Rotatably supported on the bearings 15 is a bearing housing shell 17 which is formed at its outboard end to receive the two halves 18 and 19 of a split blade root clamp. The clamp members 17 and 19 are retained in the housing 17 by a pair of bolts 20 and nuts 21.

A tubular blade spar or root 22, which supports the airfoil blade 27, is securely held between the clamp members 18 and 19 (which have an axial length substantially greater than the diameter of said spar) by the clamping action of a plurality (as for Example 3) of top and bottom clamp bars 23 connected at their ends by clamp bolts 24 and nuts 25.

The spar 22 is further secured against sliding out of the clamp by an annular shoulder 26 welded onto the spar 22 and registering with suitable annular recesses 56 and 57 in the clamp members 18 and 19.

The bearing housing 17 is slidably mounted on the bearings 15 so that in normal operation no axial thrust load can be transmitted from the blade spar 22 to the bearings 15, which serve as guides and also serve to support the weight of the blade when it is not rotating. A flange or shoulder 28 is provided on the inner end of the housing 17 as an emergency safeguard so that the bearings 15 may take up the axial load in case of failure or excessive stretch of the rod bearing—the clearance space provided between the shoulder 28 and the bearings 15 being sufficient to prevent contact in normal operation.

The axial thrust from the centrifugal force generated by the rapid rotation of the blade is transmitted to the hub through a compression tube 29, the nut 30, the tubular, multiple rod tension member 31, the clevis nut 32 and the clevis pin 33 attaching the clevis nut 32 to the eye nut 16. The inboard end of tube 29 registers with an internal annular shoulder formed in the clamp members 18 and 19, and is secured against rotation relative to the clamp by tongues 34 formed on a short sleeve 35 fixed to the tube 29.

The tension member 31 in the form here shown is a tube, externally screw-threaded at each end and slit longitudinally in its central zone to form a number of circumferentially disposed rods 36, the arrangement of which is shown in Figure 3.

The outboard end of the member 31 is screwed into nut 30 and the inboard end into the clevis nut 32—the ends being locked against turning by outer and inner pins 37 and 38 respectively. The eye nut 16 is similarly locked against turning by the pin 39.

For purposes of illustration, the attachment clamp which is the subject of our present invention is here shown in connection with a specific form of control mechanism which has been found satisfactory in practice, but is only one of many and very varied forms with which our invention may be employed.

A ring support 40, surrounding shaft 6 and secured to the fixed structure of the aircraft, serves as a mounting for a gimbal ring assembly shown particularly in Figure 1 and comprising inner gimbal ring 41, outer gimbal ring 32, outermost rotatable ring 43, balls 44 to permit rotation of ring 43 about ring 42, and diametrically opposed interconnecting pivots 58 tiltably supporting ring 41 on support 40 and diametrically opposed interconnecting pivots 45 tiltably supporting ring 42 on ring 41—the pivots 58 and 45 being at right angles to each other whereby the outer gimbal ring 42 and its associated rotatable ring 43 are free to tilt in any plane relative to the ring support 40.

A pair of control arms 46 are bolted securely to the under-side of ring 42 in line with the pins 58 and 45 and are fitted to connect with universal rod-ends 47 which receive their control displacements, through suitable linkage not shown, from the manual controls at the disposal of the pilot.

As shown in Figures 1 and 2, the outer rotatable ring 43 is constrained to turn at all times when the rotor hub 5 by interconnecting driving mechanism comprising a spider 48 keyed to the top of the hub 7, generally horizontal arms 49 pivotally attached to the spider 48 by pins 59 and generally vertical links 50 pivotally connected to the outboard ends of the arms 49 by pins 60 and universally attached at their lower ends to the ring 43, as for example by the ball and socket joints 61.

Control of blade pitch is effected by means of an arm 51 bolted to the bearing housing 17 and which is thus a rigid part of the blade assembly. The arm 51 terminates in a ball end 52 which registers with a suitable socket formed in the face of a pad 53 forming an integral part of the vertical link 50. A generally vertical pin 62 fixedly connects the ball end 52 to the main portion of the arms 51.

The airfoil blade 27 is fitted with spaced ribs 63 which are rigidly supported on the spar 22 by flanged collars 64.

In operation, the ring 43 is caused to rotate always with the hub but its plane is free to tilt in any direction in response to the combined displacements of the two control rods 47. Thus, when the plane of the ring 43 is tilted, any point on its periphery receives an oscillatory, generally vertical motion which it imparts through the link 50 and pad 53 to the arm 51, thereby causing the blade to undergo a corresponding pitch oscillation.

That is, the vertical oscillation of the link 50, is converted to a rotation of the spar 22 about its axis—an upward movement of the link 50 producing a clockwise rotation of the spar 22 (in Figure 3) to increase the pitch or angle of attack of the blade 27 and vice versa.

As the pitch of the several blades is cyclically varied during rotation of the rotor, the attitude of the aircraft is changed in the manner known in the art.

The face of the pad 53 is disposed generally tangent to the arc of a circle described about the center of the vertical blade pivot 11, thus maintaining correct registering relationship between the socket in the pad 53 and the ball end 52 of the arm 51 regardless of the angular position of the blade 27 within the limits of lag between which it may move. Likewise, the center of the ball end 52 is located approximately in the extension of the axis of the horizontal pivot pin 8, its position being therefore little altered by a change in vertical angular position of the blade 27.

When the rotor is operating at flying speeds, the only considerable load on the blade spar 22 is tension, approximately equal to the centrifugal force generated by the rotating mass of the blade itself. In practice, it has been found that, when the clamp nuts 25 are suitably tightened this entire load may readily be transferred to the clamping members 18 and 19 through friction alone (that is without the need for the shoulder 26 on the spar 22) to give a secure attachment without any holes in the spar and without any impairment whatever of the full load-carrying capacity or the fatigue-resistant properties of the spar tube.

To increase the security of the attachment, the collar 26 may additionally be welded to the inboard end of the spar as shown in Figures 2 and 4. The heat required in the welding unavoidably draws the temper and so reduces the strength of the inboard end of the spar so that the welded collar alone would not alone provide an attachment having full spar strength. The combination of the welded collar with the clamp, however, furnish an attachment having full strength with additional security against the spar slipping in case the clamping bolts should become insufficiently tight.

The outer tube 29, of the torsion bearing (which is the subject of co-pending application Serial No. 493,042, of Haviland H. Platt), filed July 1, 1943, assists the clamping action by supporting the spar tube 22 against collapse under the clamping pressure.

While for purposes of illustration, we have described our novel blade attachment construction in connection with a three-bladed airscrew, it is obvious that it could be used equally well with an airscrew having any other number of blades.

Also while, for simplicity in illustration, we have shown only cyclic pitch change, our blade attachment construction is equally adapted for use with any general pitch change mechanism, of which many forms are known in the art.

Our novel construction is also equally well adapted for use in rigid or articulated rotors and on rotors which are power-driven and/or rotated by relative air flow (autogyration).

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described our invention, what we claim as new and desire to protect by Letters Patent is:

1. An airscrew comprising a hub, an airfoil blade having a spar, a blade-supporting member carried by said hub and means for interconnecting said spar and said member, said means including an adjustable split clamp carried by said member and frictionally engaging said spar so as to maintain it in rigid axial alignment with said member, said clamp having an axial length substantially greater than the diameter of said spar whereby it is capable of frictionally transmitting from said spar to said member substantially all the centrifugal force generated by said blade during rotation of said airscrew.

2. An airscrew comprising a hub, an airfoil blade having a spar, a blade-supporting member pivotally carried by said hub, and an adjustable split clamp rigidly carried by said member and rigidly maintaining said spar in axial alignment with said member, said clamp having an axial length substantially greater than the diameter of said spar whereby it is capable of frictionally transmitting from said spar to said member substantially all the centrifugal force generated by said blade during rotation of said airscrew.

3. An articulated rotor for aircraft comprising a hub, a stub pivotally mounted upon said hub and adapted for flapping motion relative thereto, a blade-supporting member pivotally mounted at the outer end of said stub and adapted for lagging motion relative thereto, a split clamp carried by said member, and a blade having a spar, said spar having a cylindrical portion adjacent its inboard and, said cylindrical portion being engaged by said clamp and being maintained thereby in rigid axial alignment with said member, said clamp being capable of frictionally transmitting from said spar to said member substantially all the centrifugal force generated by said blade during rotation of said airscrew.

4. An articulated rotor for aircraft comprising a hub, a stub member pivotally mounted upon said hub and adapted for flapping motion relative thereto, a blade-supporting member pivotally mounted at the outer end of said stub and adapted for lagging motion and for pitch change relative thereto, a split clamp carried by said member, and a blade having a spar, said spar having a cylindrical portion adjacent its inboard end, said cylindrical portion being engaged by said clamp and being maintained thereby in rigid axial alignment with said member, said clamp being capable of frictionally transmitting from said spar to said member substantially all the centrifugal force generated by said blade during rotation of said airscrew, whereby the lagging and pitch change movements of said blade-supporting member will be transmitted to said blade.

5. An airscrew comprising a hub, a stub member carried by said hub, a lagging pivot interconnecting said hub and said stub member, a split-clamp rigidly carried by said stub member outboard of said pivot, and an airfoil blade having a spar provided with a cylindrical inboard end formed integrally therewith, the inboard end of said spar being frictionally engaged by said split-clamp and being held thereby in rigid axial alignment with said stub member, said clamp being capable of frictionally transmitting from said spar to said member substantially all the centrifugal force generated by said blade during rotation of said airscrew.

6. An airscrew comprising a hub, a blade-supporting member extending generally radially from said hub, a split-clamp carried by said member and an airfoil blade having a spar, said spar having a cylindrical portion adjacent its inboard end, said cylindrical portion being frictionally engaged by said clamp and being held thereby in rigid axial alignment with said member, said clamp being capable of frictionally transmitting from said spar to said member substantially all the centrifugal force generated by said blade during rotation of said airscrew.

7. An airscrew comprising a hub, a blade-supporting member mounted upon said hub with freedom to turn axially relative thereto, a split-clamp carried by said member, and a blade having a spar, the inboard end of said spar being frictionally engaged by said clamp and being maintained thereby in rigid axial alignment with said member, said clamp having an axial length substantially greater than the diameter of said spar whereby it is capable of frictionally transmitting from said spar to said member substantially all the centrifugal force generated by said blade during rotation of said airscrew.

8. An airscrew comprising a hub, a blade-supporting member carried by said hub, a split clamp carried by said member, and an airfoil blade having a spar, said spar being engaged by said clamp and being held thereby in rigid axial alignment with said member, said clamp having an axial length substantially greater than the diameter of said spar, so as to be capable of frictionally exerting a centripetal retaining force upon said spar during rotation of said airscrew substantially equal to the centrifugal force generated by said blade.

HAVILAND H. PLATT.
WYNN LAURENCE LE PAGE.

REFERENCES CITED

The following references are of record in the file of this patent:

UNITED STATES PATENTS

| Number | Name | Date |
| --- | --- | --- |
| 2,317,629 | McCauley | Apr. 27, 1943 |
| 2,169,849 | Pitcairn | Aug. 15, 1939 |
| 2,273,303 | Waldron | Feb. 17, 1942 |
| 2,265,366 | Hafner | Dec. 9, 1941 |
| 2,088,413 | Hafner | July 27, 1937 |
| 1,872,337 | Pillard | Aug. 16, 1932 |
| 1,977,834 | Pitcairn | Oct. 23, 1934 |
| 1,455,442 | Leparmentier | May 15, 1923 |
| 2,122,428 | Larson | July 5, 1938 |
| 2,203,012 | Campbell | June 4, 1940 |